(12) United States Patent
Clark

(10) Patent No.: US 7,600,649 B1
(45) Date of Patent: Oct. 13, 2009

(54) METHODS AND DEVICES FOR PREVENTING EXTRUSION FAILURE OF O-RING SEAL ASSEMBLIES

(75) Inventor: Kenneth Keith Clark, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 941 days.

(21) Appl. No.: 11/053,149

(22) Filed: Feb. 8, 2005

(51) Int. Cl.
*B65D 53/02* (2006.01)
*B65D 53/00* (2006.01)
(52) U.S. Cl. .................. 220/240; 220/234; 220/236; 220/239; 220/804
(58) Field of Classification Search .................. 220/240, 220/234, 239, 803, 804, 236; 270/611, 638
See application file for complete search history.

(56) References Cited

U.S. PATENT DOCUMENTS

| | | | | |
|---|---|---|---|---|
| 2,016,226 A | * | 10/1935 | Clausen | 220/240 |
| 2,862,736 A | * | 12/1958 | Russell | 277/451 |
| 3,643,695 A | | 2/1972 | Strah et al. | |
| 3,687,333 A | * | 8/1972 | Burnett et al. | 220/240 |
| 3,933,358 A | | 1/1976 | Hoer | |
| 3,971,566 A | | 7/1976 | Levinsohn et al. | |
| 4,072,328 A | | 2/1978 | Elliott | |
| 4,203,354 A | | 5/1980 | Cunningham | |
| 4,281,841 A | | 8/1981 | Kim et al. | |
| 4,443,016 A | * | 4/1984 | Schungel | 277/434 |
| 4,512,496 A | * | 4/1985 | Tsou | 220/319 |
| 4,530,238 A | * | 7/1985 | Hayman | 73/431 |
| 4,538,842 A | | 9/1985 | Kowal et al. | |
| 4,903,164 A | | 2/1990 | Bishop et al. | |
| 4,936,483 A | * | 6/1990 | Ballu | 220/240 |
| 5,123,446 A | | 6/1992 | Haunhorst et al. | |
| 5,176,276 A | * | 1/1993 | Ballu | 220/240 |
| 5,613,561 A | | 3/1997 | Moriarty | |
| 5,992,666 A | * | 11/1999 | Wu | 220/212 |
| 6,047,726 A | | 4/2000 | Kaneshige | |
| 6,364,152 B1 | * | 4/2002 | Poslinski et al. | 220/788 |
| 6,814,341 B2 | | 11/2004 | Lacroix et al. | |

* cited by examiner

*Primary Examiner*—Anthony D Stashick
*Assistant Examiner*—Niki M Eloshway
(74) *Attorney, Agent, or Firm*—Cantor Colburn LLP

(57) ABSTRACT

Methods and devices for preventing temperature and pressure extrusion failure in o-ring seal assemblies. One embodiment employs a bore in the plug so that the thin wall of the plug flexes outward at high pressures to partially fill the gap between the chamber member and the plug where the o-ring is located, thereby preventing the o-ring from extruding through the narrowed gap. A second embodiment utilizes a plug of a higher coefficient of thermal expansion than the chamber member that expands outward slightly at high temperatures, thus partially filling the gap. A third embodiment secures the o-ring in the gap between a backup ring and a retaining ring, and the backup ring has a higher coefficient of thermal expansion than the plug and chamber member. At high temperatures the backup ring expands to partially fill the gap. Additional embodiments are created by combining these three embodiments.

11 Claims, 4 Drawing Sheets

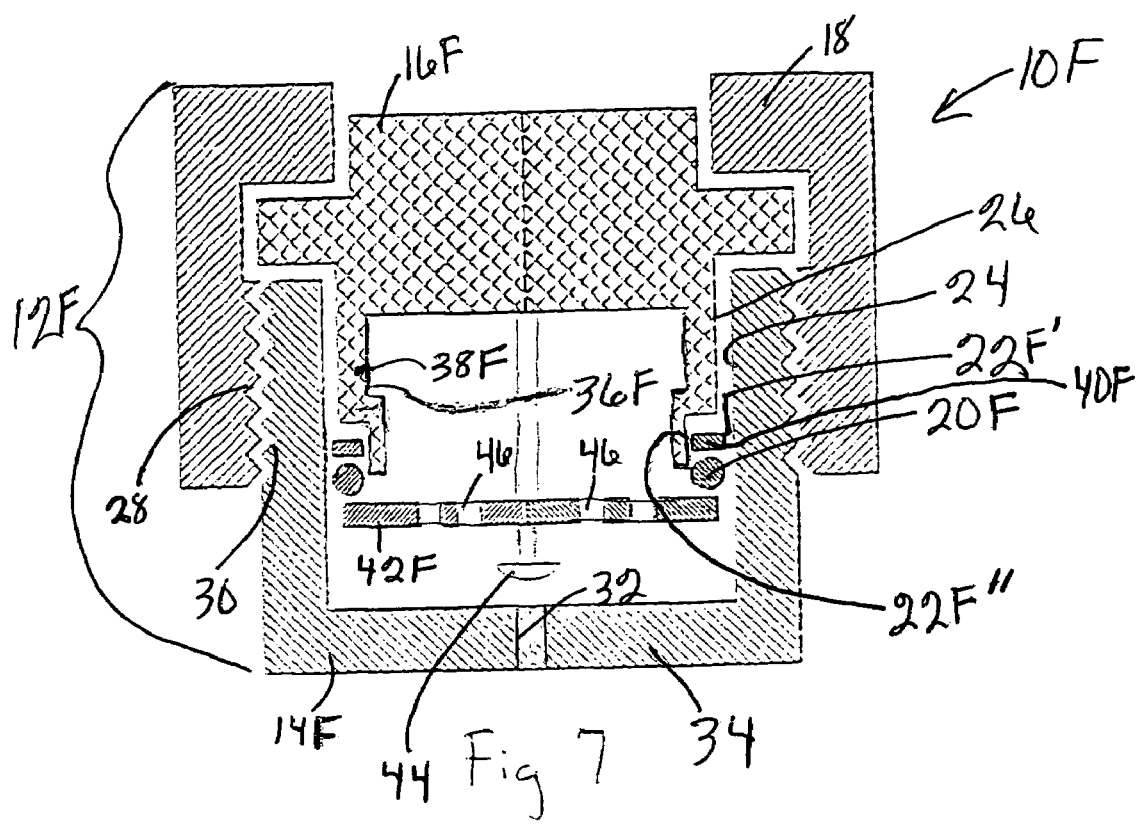

METHODS AND DEVICES FOR PREVENTING EXTRUSION FAILURE OF O-RING SEAL ASSEMBLIES

BACKGROUND OF THE INVENTION

1. Field of the Invention

The present invention relates to methods and devices that can be used alone or in combination to prevent extrusion failure of o-ring seal assemblies that are employed in high temperature and high pressure environments, such as the type of environment found down hole in a gas or oil well. Each of these methods and devices functions to reduce the gap between the plug and its associated channel member where the o-ring is located so that the when the o-ring becomes more pliable under high pressure and high temperature conditions, the gap is sufficiently narrowed to prevent the o-ring from extruding through the gap and thus preventing the failure of the o-ring.

2. Description of the Related Art

Extrusion failure of O-rings in o-ring assemblies occurs when the contained pressurized fluid forces the o-ring to extrude through the gap that exists between the adjoining parts of the seal assemblies, specifically between the plug and the chamber member. Common o-ring materials extrude more readily at very high temperatures because the rubber based material becomes weaker when very hot. Under high pressure and high temperature, an o-ring becomes more pliable and tends to flow or extrude via the gap. When this happens, the o-ring fails and the seal is lost.

Because the types of O-rings employed at high temperature and high pressure are very expensive, by reducing the failure of o-ring assemblies, the present invention reduces the costs associated with replacing the o-ring. These costs including the actual cost of the replacement o-ring and all of the other costs associated with replacing the o-ring. The other cost associated with replacing the o-ring can amount to much more that the cost of the o-ring itself. Depending on the application where the o-ring seal assembly is employed, these other replacement costs can include lost production time, cost of equipment needed to pull the failed assembly out of the production well, cost of manpower required to pull the failed assembly, etc.

Very high pressures increase the probability of extrusion failure of the o-ring for two reasons: the driving force or pressure to extrude the material is greater, and the gap between the adjoining parts increases at very high pressures in commonly used o-ring seal assemblies. In commonly used o-ring seal assemblies, as pressure in the vessel increases, the inside diameter of the vessel or chamber member increases. However, as pressure in the vessel increases, the outside diameter of the plug remains nearly constant. This results in an increasing gap between the plug and chamber member which can lead to o-ring extrusion failure. To reduce the probability of extrusion failure, it is desirable to maintain gap dimensions between the plug and chamber member near zero at very high temperatures and pressures.

Current methods of maintaining gap dimensions at near zero have generally focused on filling the gap with a non-metallic backup ring, such as Teflon, in order to try to place a barrier between the o-ring and the gap for the purpose of preventing the o-ring from extruding around the backup ring and then through the gap. None of the current methods have addressed the problem by utilizing the increasing temperature and pressure to assist in reducing the gap.

The present invention addresses this problem by employing three different methods and devices, each of which can be used alone or in combination, to reduce the gap between the plug and chamber member at high temperature and pressure and thereby prevent o-ring failure in o-ring seal assemblies.

SUMMARY OF THE INVENTION

The present invention employs three methods and devices for preventing extrusion failure in o-ring seal assemblies that are used in high temperature and high pressure environments, such as the type of environment experienced down hole in oil and gas wells. These methods and devices can be used alone or in combination. The preferred embodiment of the invention creates a bore in the plug as large as possible so that the wall of the plug is sufficiently thin to allow the wall to expand outward slightly when the bore of the plug experiences high pressure. Although not part of the invention, the chamber member is normally provided with an opening there through to allow pressurized fluid to enter the chamber member and reach the plug. As the pressure inside the o-ring assembly increases, the wall of the plug expands outward so that the outside diameter (OD) of the plug partially fills the gap created between the chamber member and the plug. This narrowing of the gap helps to prevent the o-ring from extruding through the gap as the pressure inside the o-ring assembly increases.

A second embodiment of the present invention utilizes a plug and chamber member constructed of different types of materials. The material from which the plug is created has a higher coefficient of thermal expansion than the material from which the chamber member is constructed. Use of these two different types of materials allows the differential thermal expansion of the plug relative to the chamber member to cause the plug to increase in diameter very rapidly with an increase in temperature as the chamber expands less under the influence of both pressure and temperature. In this embodiment, as the temperature of the seal assembly increases, the plug expands outward to a larger degree than the outward expansion of the chamber member, thus narrowing the gap that is created between the chamber member and the plug. Similar to the preferred embodiment, this narrowing of the gap helps to prevent the o-ring from extruding through the gap as the temperature and pressure of the o-ring assembly increases.

A third embodiment of the present invention utilizes a backup ring for the o-ring. That backup ring is constructed of material that has a higher coefficient of expansion than the materials employed in the construction of the plug and chamber member. A retaining disc is provided attached to the plug via one or more bolts or other suitable fastening means so that the o-ring is held between the backup ring and the retaining disc. As the temperature of the o-ring assembly increases, the backup ring expands more rapidly than the plug and the chamber member, thereby causing the backup ring to expand and thereby effectively narrowing a gap that is created between the backup ring and the chamber member and narrowing a second gap that is created between the backup ring and the plug. As with the second embodiment, this narrowing of the gaps helps to prevent the o-ring from extruding through the gaps as the temperature of the o-ring assembly increases.

A fourth embodiment is created by combining the preferred and second embodiments. A fifth embodiment is created by combining the preferred and third embodiments. A sixth embodiment is created by combining the second and third embodiments. And a seventh embodiment is created by combining the preferred, second and third embodiments. Embodiments 5 and 7 require that at least one hole be provided in the retaining disc to allow pressurization of the bore of the plug, as taught in the preferred embodiment.

BRIEF DESCRIPTION OF THE DRAWINGS

FIG. 7 is a cross sectional view of an o-ring seal assembly employing a combination of the preferred, second and third embodiments of the present invention.

DETAILED DESCRIPTION OF THE PREFERRED EMBODIMENT

The Invention

Figure 1:
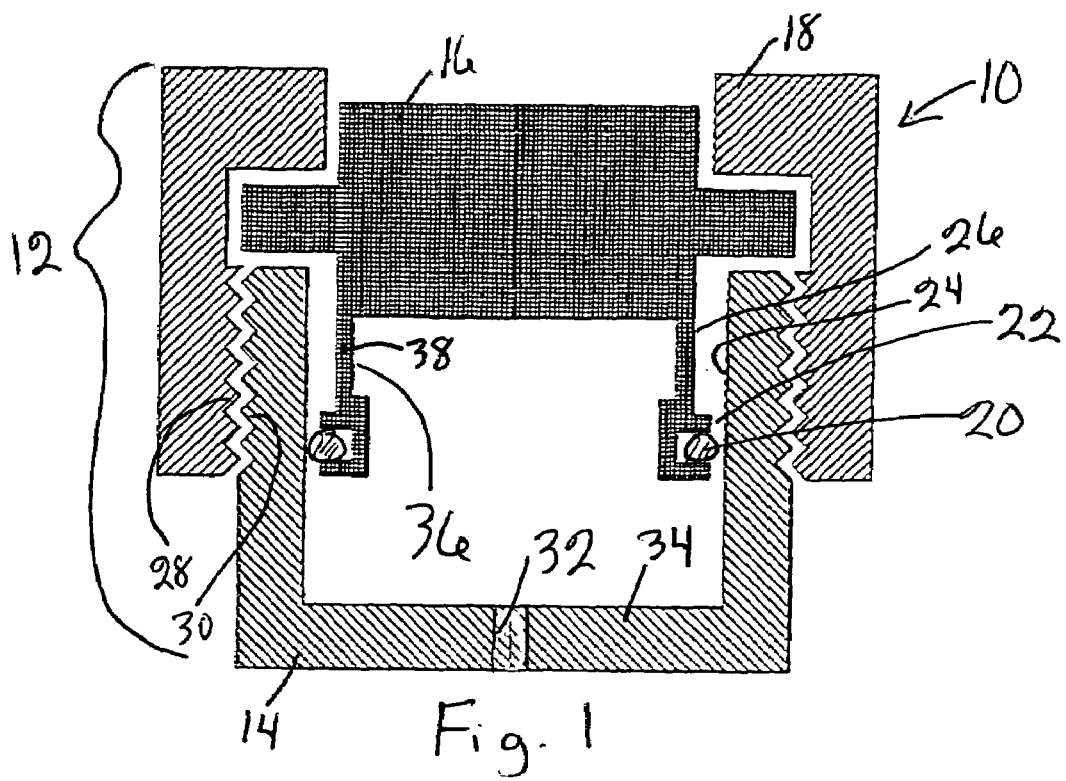
FIG. 1 is a cross sectional view of an o-ring seal assembly employing a preferred embodiment of the present invention for preventing extrusion failure of o-ring seal assemblies.

Referring now to the drawings and initially to FIG. 1, there is illustrated a preferred embodiment 10 of the present invention employing in an o-ring seal assembly 12 for preventing extrusion failure of the o-ring seal assembly under increased pressure and temperature conditions, such as for example the conditions that would be experienced by a tubing string located at the bottom of an oil or gas well.

As shown in all of the drawings, a typical o-ring seal assembly 12 consists of a chamber member 14 held in sealing arrangement with a plug 16 and its associated collar 18 via an o-ring 20 that is located in a gap 22 that exists between an inside surface 24 of the chamber member 14 and an outside surface 26 of the plug 16. As typical with o-ring seal assemblies 12, the collar 18 is provided with female threads 28 that engage male threads 30 provided on the chamber member 14 as a means of holding the plug 16 within the chamber member 14, and the chamber member 14 is provided with an opening 32 extending through a wall 34 of the chamber member 14 to allow pressure to enter the chamber member 14 and reach the plug 16.

Referring again to FIG. 1, the preferred embodiment 10 creates a bore 36 in the plug 16 as large as possible so that a wall 38 of the plug 16 surrounding the bore 36 is sufficiently thin to allow the wall 38 to expand outward slightly when the bore 36 of the plug 16 experiences high pressure. As the pressure inside the o-ring assembly 12 increases, the wall 38 of the plug 16 expands outward so that the outside surface 26 or outside diameter (OD) of the plug 16 partially fills the gap 22 that is created between the chamber member 14 and the plug 16. This narrowing of the gap 22 helps to prevent the o-ring 20 from extruding through the gap 22 as the pressure inside the o-ring assembly 12 increases.

Figure 2:
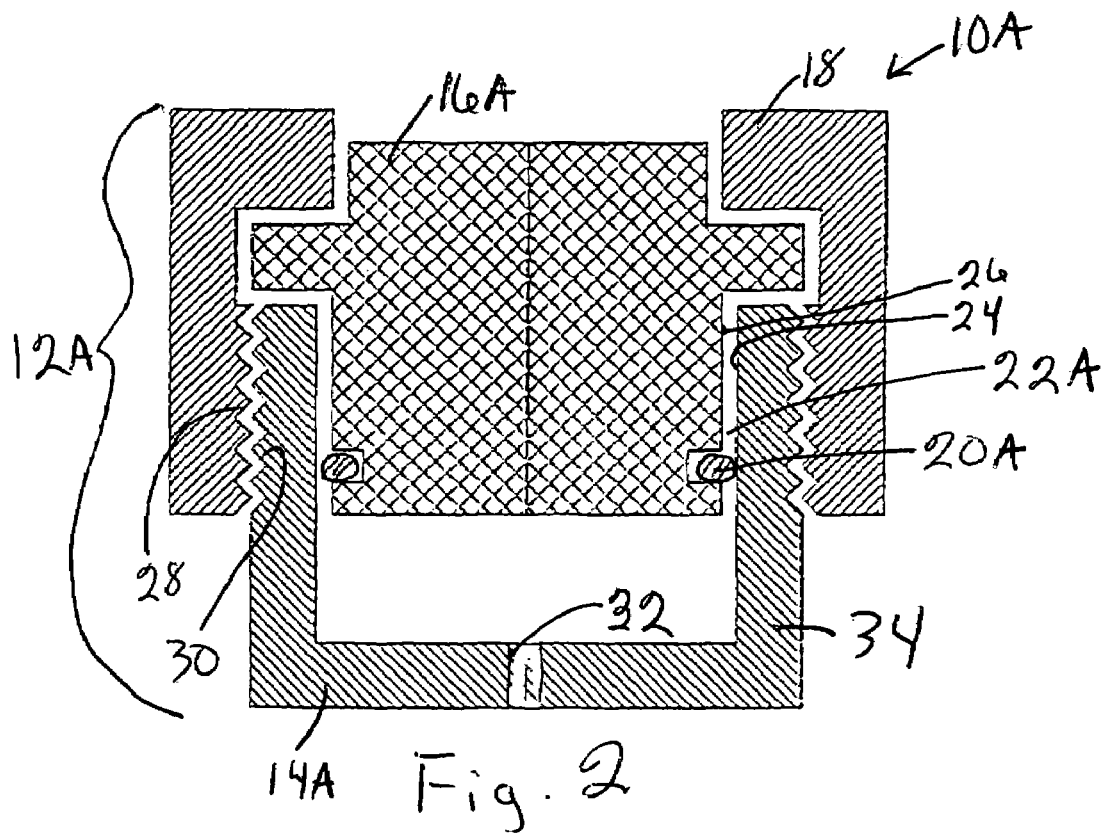
FIG. 2 is a cross sectional view of an o-ring seal assembly employing a second embodiment of the present invention.

Referring now to FIG. 2, there is illustrated an o-ring seal assembly 12A employing a second embodiment 10A of the present invention for preventing extrusion failure of the o-ring seal assembly 12A under increased pressure and temperature conditions. The second embodiment 10A utilizes a plug 16A and chamber member 14A constructed of different types of materials with the material from which the plug 16A is created having a higher coefficient of thermal expansion than the material from which the chamber member 14A is constructed. The materials used for constructing the chamber member 14A and the plug 16A preferably are metals. Use of these different types of materials allows the differential thermal expansion of the plug 16A relative to the chamber member 14A to cause the plug 16A to increase in diameter very rapidly with an increase in temperature as the chamber member 14A increases less under the influence of both pressure and temperature. This creates a situation where the plug 16A expands outward slightly relative to the chamber member 14A when the o-ring assembly 12A experiences high temperature. Because with increasing temperature the plug 16A expands outward to a larger degree than the outward expansion of the chamber member 14A, this narrows the gap 22A that is created between the chamber member 14A and the plug 16A. Similar to the preferred embodiment 10, this narrowing of the gap 22A helps to prevent o-ring 20A from extruding through the gap 22A as the temperature and pressure of the o-ring seal assembly 12A increases.

Figure 3:
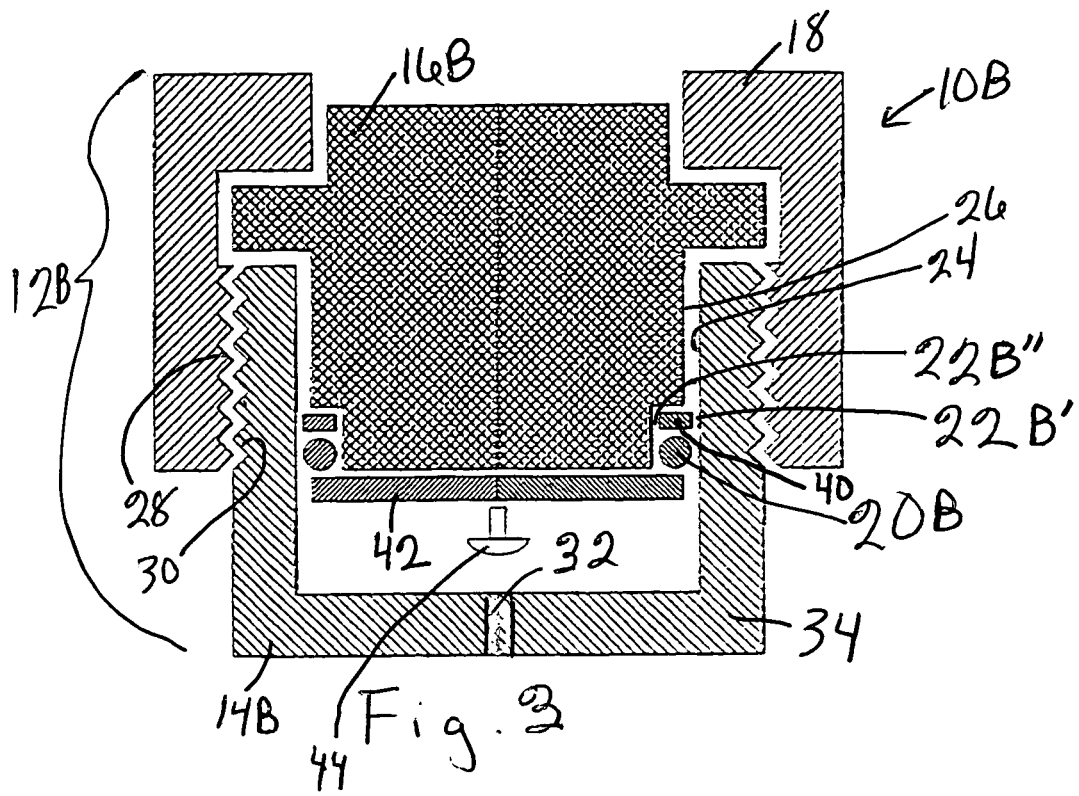
FIG. 3 is a cross sectional view of an o-ring seal assembly employing a third embodiment of the present invention.

Referring now to FIG. 3, there is illustrated an o-ring seal assembly 12B employing a third embodiment 10B of the present invention for preventing extrusion failure of the o-ring seal assembly 12B under increased pressure and temperature conditions. The third embodiment 10B utilizes a backup ring 40 for an o-ring 20B, and that backup ring 40 is constructed of material that has a higher coefficient of expansion than the materials employed in the construction of its associated plug 16B and chamber member 14B. As previously described for chamber member 14A and plug 16A, the material used for constructing the backup ring 40 will preferably be metal. A retaining disc 42 is provided attached to the plug 16B via one or more bolts 44 so that the o-ring 20B is held between the backup ring 40 and the retaining disc 42. As the temperature of the o-ring assembly 12B increases and the backup ring 40 expands more rapidly than the plug 16B and the chamber member 14B, this causes the backup ring 40 to narrow a first gap 22B' that is created between the backup ring 40 and the chamber member 14B and a second gap 22B" that is created between the backup ring 40 and the plug 16B. As with the second embodiment 10A, this narrowing of the gaps 22B' and 22B" helps to prevent the o-ring 20B from extruding through the gaps 22B' and 22B" as the temperature of the o-ring assembly 12B increases.

Figure 4:
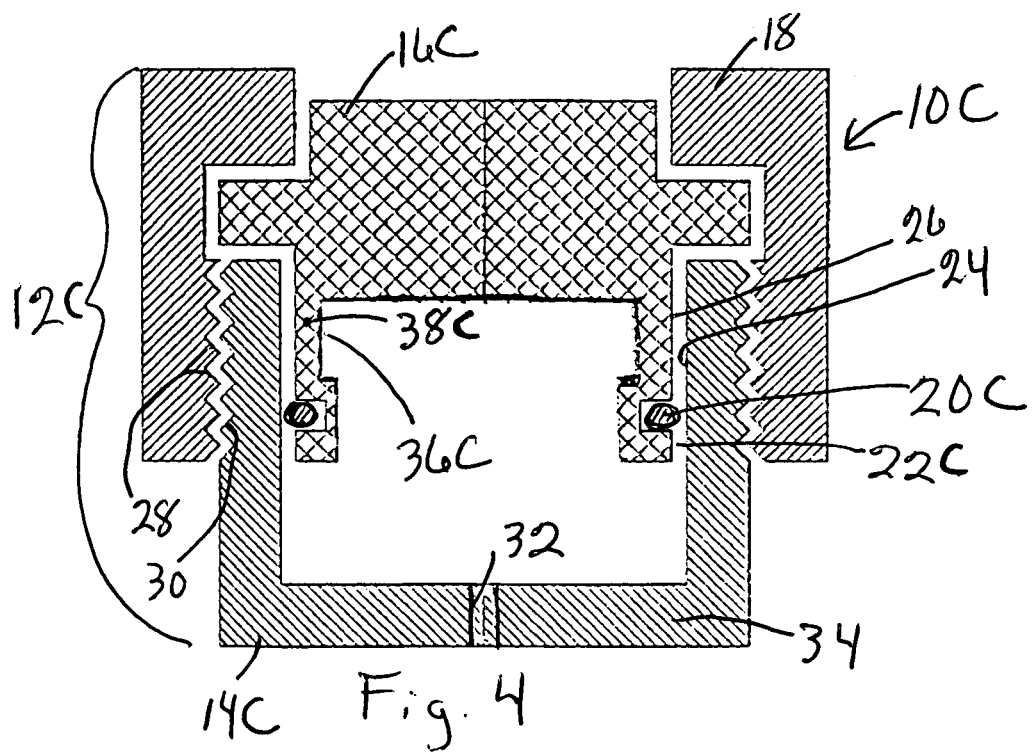
FIG. 4 is a cross sectional view of an o-ring seal assembly employing a combination of the preferred and second embodiments of the present invention.

Referring to FIG. 4, there is illustrated an o-ring seal assembly 12C employing a fourth embodiment 10C of the present invention for preventing extrusion failure of the o-ring seal assembly 12C under increased pressure and temperature conditions. The fourth embodiment 10C is a combination of the previously described preferred embodiment 10 and the previously described second embodiment 10A. Specifically, the fourth embodiment 10C employs a bore 36C of plug 16C as large as possible so that a wall 38C of the plug 16C expands outward slightly when the bore 36C of the plug 16C experiences high pressure. Also, the fourth embodiment 10C has the plug 16C and its associated chamber member 14C constructed of different types of materials so the material from which the plug 16C is created has a higher coefficient of thermal expansion than the material from which the chamber member 14C is constructed. The combination of features of this fourth embodiment 10C result in a narrowing of the gap 22C between the chamber member 14C and the plug 16C, thereby helping to prevent o-ring 20C from extruding through the gap 22C as the temperature and pressure of the o-ring seal assembly 12C increases.

Figure 5:
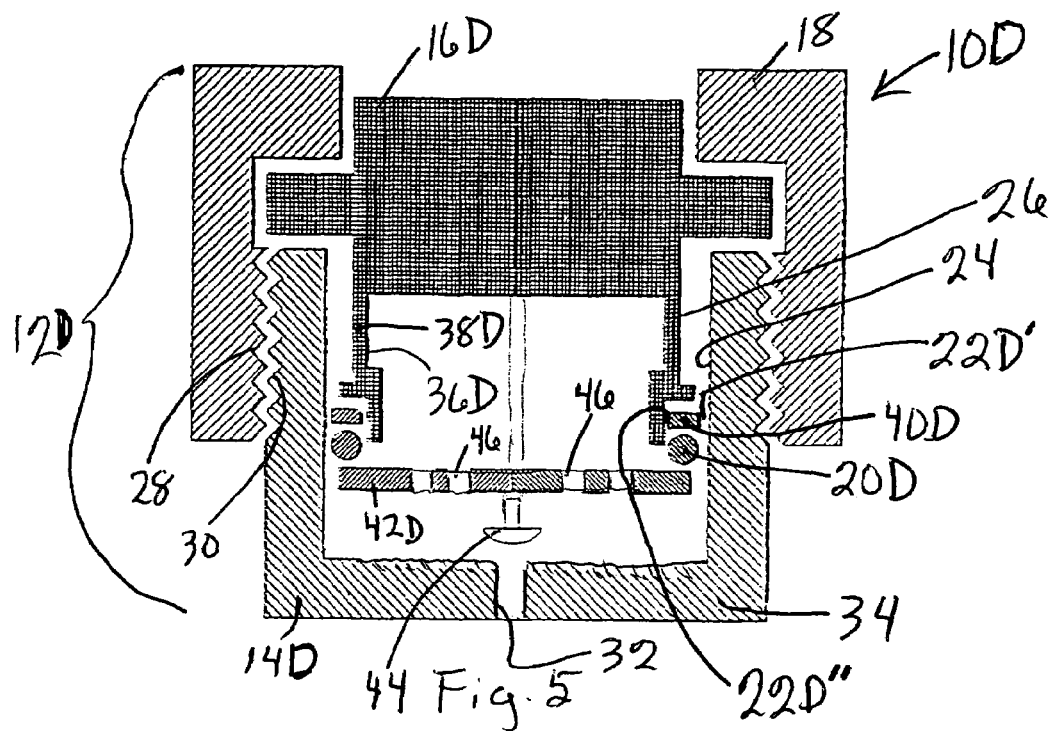
FIG. 5 is a cross sectional view of an o-ring seal assembly employing a combination of the preferred and third embodiments of the present invention.

Referring to FIG. 5, there is illustrated an o-ring seal assembly 12D employing a fifth embodiment 10D of the present invention for preventing extrusion failure of the o-ring seal assembly 12D under increased pressure and temperature conditions. The fifth embodiment 10D is a combination of the previously described preferred embodiment 10 and the previously described third embodiment 10B. Specifically, the fifth embodiment 10D employs a bore 36D in its plug 16D as large as possible so that a wall 38D of the plug 16D expands outward slightly when the bore 36D of the plug 16D experiences high pressure. Also, the fifth embodiment 10D employs a backup ring 40D for its o-ring 20D and that backup ring 40D is constructed of material that has a higher coefficient of expansion than the materials employed in the construction of the plug 16D and chamber member 14D. A modified retaining disc 42D is also provided attached to the plug 16D via one or more bolts 44 so that the o-ring 20D is held between the backup ring 40D and the modified retaining disc 42D. This modified retaining disc 42D is provided with at least one opening 46 extending through the disc 42D in order to allow pressurization of the bore 36D of the plug 16D. The combination of features of this fifth embodiment 10D result in a narrowing of the first and second gaps 22D' and 22D" located respectively between the backup ring 40D and the chamber member 14D and between the backup ring 40D and the plug 16D, thereby helping to prevent o-ring 20D from extruding through the gaps 22D' and 22D" as the temperature and pressure of the o-ring seal assembly 12D increases.

Figure 6:
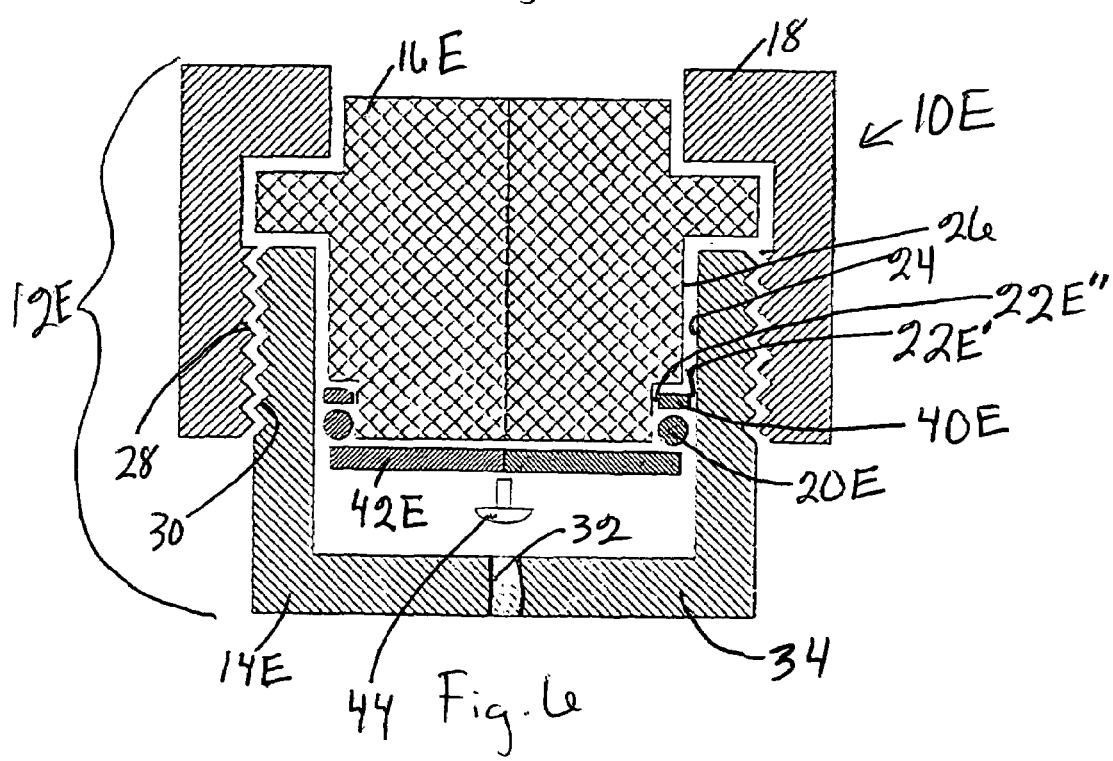
FIG. 6 is a cross sectional view of an o-ring seal assembly employing a combination of the second and third embodiments of the present invention.

Referring to FIG. 6, there is illustrated an o-ring seal assembly 12E employing a sixth embodiment 10E of the present invention for preventing extrusion failure of the o-ring seal assembly 12E under increased pressure and temperature conditions. The sixth embodiment 10E is a combination of the previously described second embodiment 10A and the previously described third embodiment 10B. Specifically, the sixth embodiment 10E employs a plug 16E and chamber member 14E constructed of different types of materials so the material from which the plug 16E is created has a higher coefficient of thermal expansion than the material from which the chamber member 14E is constructed Also, the sixth embodiment 10E employs a backup ring 40E for its associated o-ring 20E and that backup ring 40E is constructed of material that has a higher coefficient of expansion than the materials employed in the construction of the plug 16E and chamber member 14E. A retaining disc 42E is also provided attached to the plug 16E via one or more bolts 44 so that the o-ring 20E is held between the backup ring 40E and the retaining disc 42E. The combination of features of this sixth embodiment 10E result in a narrowing of the first and second gaps 22E' and 22E" located respectively between the backup ring 40E and chamber member 14E and between the backup ring 40E and the plug 16E, thereby helping to prevent o-ring 20E from extruding through the gaps 22E' and 22E" as the temperature and pressure of the o-ring seal assembly 12E increases.

Referring to FIG. 7, there is illustrated an o-ring seal assembly 12F employing a seventh embodiment 10F of the present invention for preventing extrusion failure of the o-ring seal assembly 12F under increased pressure and temperature conditions. The seventh embodiment 10F is a combination of the previously described preferred embodiment 10, the previously described second embodiment 10A, and the previously described third embodiment 10B. Specifically, the seventh embodiment 10F employs a bore 36F in its plug 16F as large as possible so that a wall 38F of the plug 16F expands outward slightly when the bore 36F of the plug 16F experiences high pressure. The seventh embodiment 10F also has its plug 16F and chamber member 14F constructed of different types of materials so the material from which the plug 16F is created has a higher coefficient of thermal expansion than the material from which the chamber member 14F is constructed Additionally, the seventh embodiment 10F employs a backup ring 40F for its o-ring 20F, and that backup ring 40F is constructed of material that has a higher coefficient of expansion than the materials employed in the construction of the plug 16F and chamber member 14F. A modified retaining disc 42F is also provided attached to the plug 16F via one or more bolts 44 so that the o-ring 20F is held between the backup ring 40F and the modified retaining disc 42F. As with the modified retaining disc 42D, this modified retaining disc 42F is provided with at least one opening 46 extending through the disc 42F in order to allow pressurization of the bore 36F of the plug 16F. The combination of features of this seventh embodiment 10F result in a narrowing of the first and second gaps 22F' and 22F" located respectively between the backup ring 40F and chamber member 14F and between the backup ring 40F and the plug 16F, thereby helping to prevent o-ring 20F from extruding through the gaps 22F' and 22F" as the temperature and pressure of the o-ring seal assembly 12F increases.

Although the present invention has been described for use in association with a gas or oil well, the invention is not so limited and can be used in other types of high pressure and high temperature environments where o-ring seal assemblies 12 are needed.

Also, it is preferable that the chamber members 12, 12A, 12B, 12C, 12D, 12E, and 12F; the plugs 16, 16A, 16B, 16C, 16D, 16E, and 16F; and the backup rings 40, 40D, 40E and 40F are each constructed of material that is metal so that the resulting o-ring seal assemblies 12, 12A, 12B, 12C, 12D, 12E, and 12F are sufficiently strong to withstand the high temperature and high pressure environments for which the embodiments of the present invention 10, 10A, 10B, 10C, 10D, 10E, and 10F were designed.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An improved o-ring seal assembly for preventing o-ring extrusion having an o-ring that seals between a plug and a chamber member wherein the improvement comprises:

a plug provided internally with a bore so that a wall of the plug surrounding the bore is sufficiently thin to allow the wall to expand outward slightly when the bore of the plug experiences high pressure to thereby partially fill a gap between an associated chamber member and the plug where an o-ring is located; and a backup ring provided in a gap formed between the plug and its associated chamber member, said backup ring constructed of a material that has a higher coefficient of expansion than the materials from which its associated plug and chamber member are constructed so that the backup ring expands when exposed to high temperature to thereby partially fill the gap between the chamber member and the plug, a retaining disc provided attached to the plug so that an o-ring is held in the gap between the backup ring and the retaining disc, and said retaining disc provided with at least one opening extending through the disc to allow pressurization of the bore of the plug.

2. An improved o-ring seal assembly according to claim 1 wherein said plug is constructed of metal.

3. An improved o-ring seal assembly according to claim 1 wherein the plug is constructed of a material that has a higher coefficient of expansion than the material from which its associated chamber member is constructed so that the plug expands when exposed to high temperature to partially fill the gap between the chamber member and the plug where an o-ring is located.

4. An improved o-ring seal assembly according to claim 3 wherein the materials from which said plug and said chamber member are constructed are metal.

5. An improved o-ring seal assembly according to claim 1 wherein the materials from which said plug, said chamber member and said backup ring are constructed are metal.

6. An improved o-ring seal assembly for preventing o-ring extrusion having an o-ring that seals between a plug and a chamber member wherein the improvement comprises:
   a plug constructed of a material that has a higher coefficient of expansion than the material from which its associated chamber member is constructed so that the plug expands when exposed to high temperature to thereby partially fill the gap between the chamber member and the plug where an o-ring is located; and
   a backup ring provided in a gap formed between the plug and its associated chamber member, said backup ring constructed of a material that has a higher coefficient of expansion than the materials from which its associated plug and chamber member are constricted so that the backup ring expands when exposed to high temperature to partially fill the gap between the chamber member and the plug, and a retaining disc provided attached to the plug so that an o-ring is held in the gap between the backup ring and the retaining disc.

7. An improved o-ring seal assembly according to claim 6 wherein the materials from which said plug and said chamber member are constructed are metal.

8. An improved o-ring seal assembly according to claim 6 wherein the materials from which said plug, said chamber member and said backup ring are constructed are metal.

9. An improved o-ring seal assembly for preventing o-ring extrusion having an o-ring that seals between a plug and a chamber member wherein the improvement comprises:
   a backup ring provided in a gap formed between a plug and its associated chamber member, said backup ring constructed of a material that has a higher coefficient of expansion than the materials from which its associated plug and chamber member are constructed so that the backup ring expands when exposed to high temperature to thereby partially fill a gap between the chamber member and the plug, and a retaining disc provided attached to the plug so that an o-ring is held in the gap between the backup ring and the retaining disc.

10. An improved o-ring seal assembly according to claim 9 wherein the materials from which said plug, said chamber member, and said backup ring are constructed are metal.

11. A method for preventing o-ring extrusion in an o-ring seal assembly where an o-ring seals between a plug and an associated chamber member comprising the following steps:
   constructing a plug of a material that has a higher coefficient of expansion than the material from which its associated chamber member is constructed so that the plug expands when exposed to high temperature to partially fill the gap between the chamber member and the plug where an o-ring is located; and
   constructing a backup ring with a material that has a higher coefficient of expansion than the materials from which its associated plug and chamber member are constructed, adding the backup ring in a gap formed between the plug and its associated chamber member so that the backup ring expands when exposed to high temperature to thereby partially fill the gap between the chamber member and the plug, and attaching a retaining disc to the plug so that an o-ring is held in the gap between the backup ring and the retaining disc.

* * * * *